Dec. 19, 1961 R. A. BLUNT 3,013,686
BOTTLE

Filed March 7, 1956 3 Sheets-Sheet 1

INVENTOR
ROYDEN A. BLUNT

BY Charles L. Sturtevant
ATTORNEY

Dec. 19, 1961   R. A. BLUNT   3,013,686
BOTTLE
Filed March 7, 1956   3 Sheets-Sheet 2
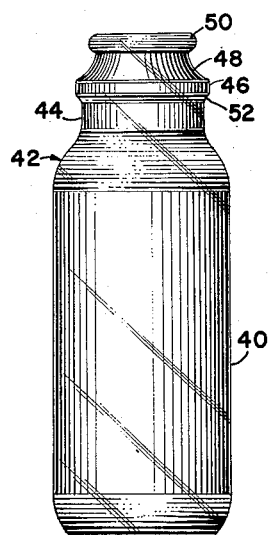
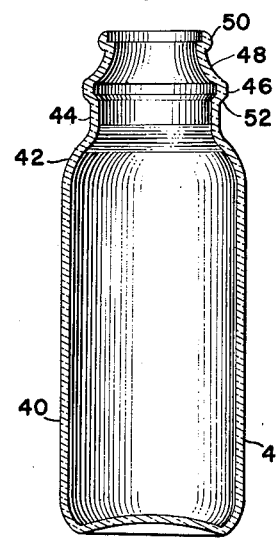
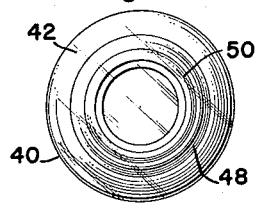
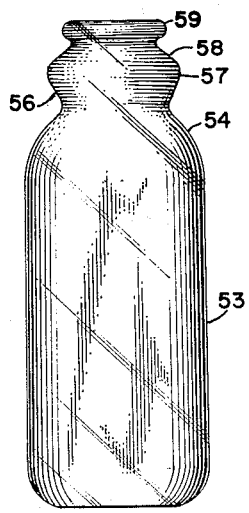
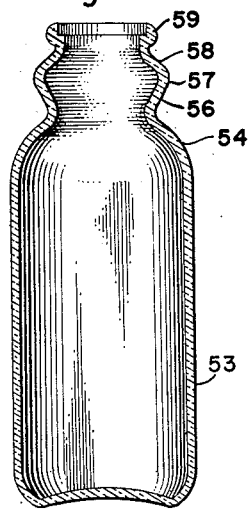
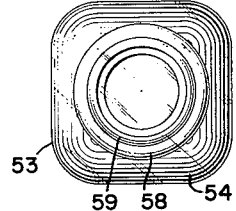
INVENTOR
ROYDEN A. BLUNT
BY Charles L. Sturtevant
ATTORNEY Dec. 19, 1961   R. A. BLUNT   3,013,686
BOTTLE
Filed March 7, 1956   3 Sheets-Sheet 3
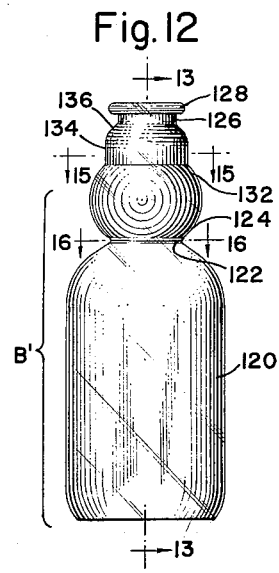
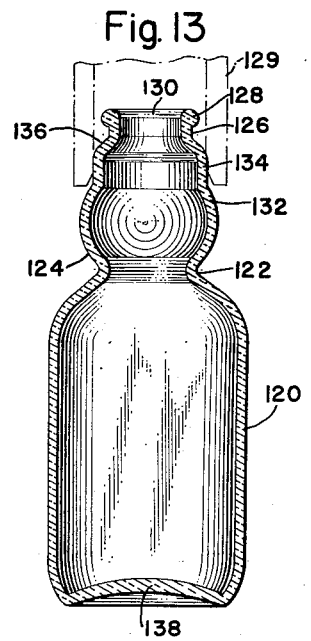
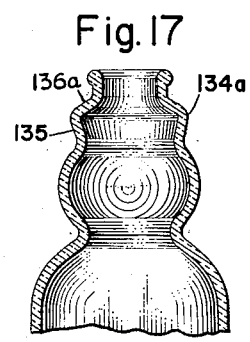
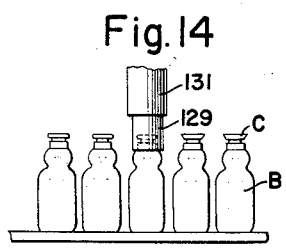
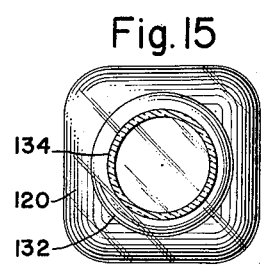
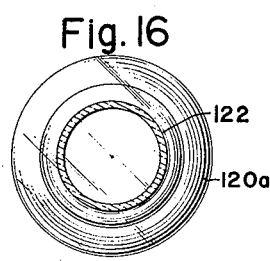
INVENTOR
ROYDEN A. BLUNT
BY Charles L. Sturtevant
ATTORNEY

United States Patent Office 3,013,686
Patented Dec. 19, 1961

3,013,686
BOTTLE
Royden A. Blunt, 700 N. Charles St., Baltimore, Md.
Filed Mar. 7, 1956, Ser. No. 570,121
2 Claims. (Cl. 215—31)

The present invention relates to new and useful improvements in containers and more particularly to improvements in glass containers, such as milk bottles and the like.

In the manufacture of various types of containers, such as bottles having a reduced neck portion terminating in a pouring opening—a good example being glass milk bottles or the like—it is desirable to form the bottle in a manner which will assist in the handling thereof in various types of bottle handling machinery, such as filling, capping, or washing machines. Heretofore, it has been proposed to provide an annular pressed bead or pressed bumper ring around the neck portion of the bottle and disposed slightly below the usual finish or open pouring end thereof. This prior pressed glass ring has been heretofore formed by an accumulation of dead glass so that the thickness of the body wall of the neck portion is substantially increased at that and other adjacent points. In other words, prior to the actual blowing operation, as the parison is formed in the blank mold, the plunger extends into the charge of molten glass and presses the available molten glass of the charge into a complemental mold cavity to form the neck with this annular ring and the top outward bead around the open end prior to the actual blowing operation which completes formation of the bottle. Thus, this ring is an outwardly pressed deformation as distinguished from one formed completely by and during the blowing operation. In bottle handling machinery, as for instance in a capping machine, there is customarily provided a depending skirt or the like which is adapted to engage this annular ring in order to stabilize and center the bottle during the capping operation. Similarly, in washing machines, this ring may serve as a stop properly to locate the bottle during maneuvering and processing thereof in the machine.

According to the present invention, this annular ring is completely eliminated but, in so doing, the invention aims to provide a finished bottle having the same desirable handling characteristics in various bottle handling machines, as well as other advantages to be pointed out hereinafter.

Efforts to reduce the weight of glass bottles, and particularly those designed for repeated and multi-trip use where the cost of shipment is an important factor, have met with only partial success. In reducing the weight of the bottles, care must be taken to maintain substantially the same strength and resistance to breakage since they are subjected to the same handling as are conventional bottles during their repeated use. Here again, a good example of such a multi-trip bottle is a milk bottle in its various sizes, such as half-pint, pint, quart and two quart, both in standard design and in cream chamber type.

Accordingly, the present invention also contemplates the provision of a multi-trip, light weight bottle, such as a milk bottle, with substantially thinner wall thicknesses than previously thought practical but with substantially improved qualities of resistance to breakage during shipment as well as in bottle handling machinery and substantial economy in shipment.

Therefore, one of the principal objects of the present invention is to provide a bottle type container having an event distribution of glass throughout the relatively thin wall portions thereof so as to permit even tempering and annealing and toughening which results in more uniform toughness and resistance to breakage, as well as in minimizing the tendency of the bottles to scratch or crack.

Another object of the present invention is to provide a bottle type container substantially of the above type wherein the neck is provided with an annular wall portion disposed substantially normal to or alternatively disposed to project in downwardly and inwardly tapered relation to the plane of the bottle mouth and slightly therebelow to provide centering or guiding means in bottle handling machinery and in the alternate construction also to provide a sanitary hand gripping portion remote from the finish.

Another object of the invention is to provide a bottle substantially of the above type wherein the neck portion is outwardly and substantially peripherally shouldered below the open end thereof to present an annular blown centering wall portion without increased cross sectional thickness thereof as heretofore accomplished by means of a pressed bead or ring.

Another object of the invention is to provide a bottle substantially of the above type wherein the body wall throughout substantially the entire extend thereof is of substantially uniform and relatively thin cross sectional thickness, thus permitting the maintenance of a desired and uniform cooling rate of hot bottles by eliminating increased thicknesses of accumulated material which tends to retain heat and also to impart heat to other nearby or adjacent sections and the elimination of strains set up in the cooled bottles, such strains being normally caused by uneven wall thicknesses.

A further object of the invention is to provide a bottle substantially of the above type having reduced top weight and one which permits a substantial cumulative saving of material in the manufacture thereof with resultant reduction in weight.

A still further object of the invention is to provide a bottle substantially of the above type which is substantially completely formed by blowing to eliminate the accumulation of waste material.

A still further object of the invention is to provide a bottle having a completely blown and accurately dimensioned external guiding surface adjacent the open end of the bottle adapted for guiding and like purposes in bottle handling machinery.

A still further object of the invention is to provide a bottle substantially of the above type wherein the thin and uniform glass thickness of the outward wall or shoulder formation provides a roomier interior, thus facilitating faster filling by reducing accumulation of foam or the like.

The above and various other objects of the invention will in part be obvious and will be hereinafter more fully pointed out, reference being had to the accompanying drawings and to the detailed description thereof.

In the accompanying drawings, wherein like reference numerals refer to like parts throughout the several views:

FIGURE 6 is a side elevation showing a milk bottle with the blown pre-dimensioned guiding or centering ring modified to facilitate handling of the bottle;

FIGURES 7 and 8 are longitudinal sectional and top plan views, respectively, of FIGURE 6;

FIGURE 9 is a side elevation of a milk bottle, similar to FIGURE 6, but showing the preferred form of a blown guiding or centering ring combined with a sanitary grip located relatively remote from the cap surface;

FIGURES 10 and 11 are longitudinal sectional and top plan views, respectively, of FIGURE 9;

FIGURE 12 is a side elevation of a cream chamber type bottle incorporating the improvements of the present invention;

FIGURE 13 is an enlarged longitudinal section of FIGURE 12;

FIGURE 14 is a diagrammatic elevation showing a group of cream chamber type bottles in association with a capping head;

FIGURE 15 is a transverse section through the guide surface of FIGURE 12;

FIGURE 16 is a transverse section through the reduced throat of FIGURE 12; and

FIGURE 17 is a fragmentary section, similar to FIGURE 13, but showing the guide surface in the form of a sanitary grip.

Figure 1:
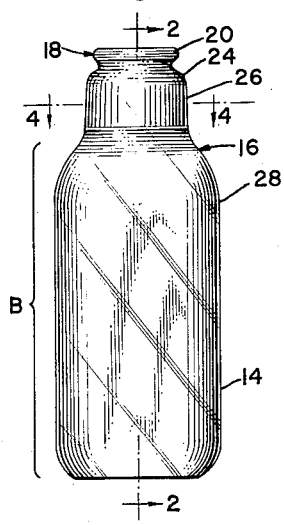
FIGURE 1 is a side elevation showing a milk bottle incorporating the improvements of the present invention.

Referring more in detail to the accompanying drawings and particularly to FIGURES 1–5 thereof, it will be seen that the bottle B forming the subject matter of the present invention generally includes a body wall portion 14, a neck portion 16 of reduced periphery and a pouring mouth or finish 18 of preferably still further reduced periphery. Thus, the body portion 14 merges inwardly into the neck portion 16 which in turn merges into the pouring mouth or finish 18 which has an external bead or finish 20 forming an annular pouring lip and within which is the pouring opening 22. Slightly below the finish 20 at the extreme top of the bottle, the body wall is directed outwardly and downwardly, as at 24, and this shoulder portion 24 merges into a substantially cylindrical or annular wall portion 26 which in one form may be substantially normal to the transverse plane of the mouth of the bottle. The lower part of the neck portion of the bottle then extends outwardly and downwardly, as at 28, and this portion 28 merges into the body portion 14. The bottom of the body portion is closed by a bottom closing wall 30. In this connection, it is to be particularly noted that the cross sectional thickness of the peripheral side wall of the bottle throughout the extent of the body portion 14, the neck portion 26 and 28, and along the shoulder portion 24 up to a point adjacent the finish 20 is substantially uniform.

The cylindrical wall portion 26 within the neck portion 16 defines a shoulder or outward annular portion disposed within a vertical projection of the body wall of the body portion 14 and preferably exteriorly of a like projection of the finish or pouring lip 20 at the open end of the bottle. This outward cylindrical portion 26 provides a surface against which depending fingers or a skirt 32 on a capping head 34 of a capping machine or the like may snugly engage in order to stabilize and center an individual bottle for the capping operation. This same guiding surface 26 may be utilized for centering or the like at the filling station and also for proper positioning in various types of bottle washing machinery. As diagrammatically shown in FIGURE 3, the depending skirt portion 32 of the capping machine is in engagement with the cylindrical surface 26 at the capping station for stabilizing and centering the bottle B during the capping operation, after which the bottles with caps C or other closures applied are passed along.

Figure 4:
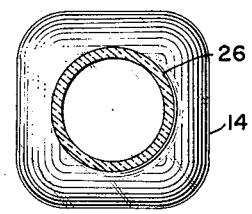
FIGURE 4 is an enlarged sectional view taken substantially along the line 4—4 of FIGURE 1 and showing a squared type of body portion.
Figure 5:
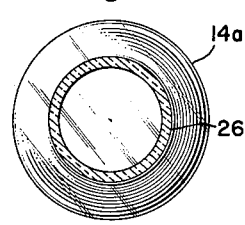
FIGURE 5 is a sectional view similar to FIGURE 4 but showing a bottle with a round type of body portion.

The centering or guiding surface 26 is shown for purposes of illustration as being cylindrical for cooperation with certain well known types of bottle handling machinery. However, the guiding surface 26 may be multifaced, angular, squared, partially squared, or curved, to function in the same manner in certain instances. It is to be clearly understood also that the body portion 14 of the container may be of the squared type as shown in FIGURE 4 or of the round type as indicated by the numeral 14a in FIGURE 5.

In FIGURES 6–11, there are shown further modifications of the bottle of the present invention, particularly with respect to modified forms of the blown, predimensioned guiding or centering surfaces to facilitate handling of the bottle, that is, manual handling thereof or machine handling as in glass machines employing tongs to engage and manipulate the bottles. Referring in detail to FIGURES 6, 7 and 8, there is shown a milk bottle having a round body portion 40 merging along an inwardly curved wall portion 42 into a substantially vertical straight peripheral wall portion 44. Immediately above the wall portion 44, there is provided an outwardly blown wall portion 46 which projects peripherally slightly beyond the peripheral surface of the wall portion 44 and which merges at the upper portion thereof into an inwardly directed wall or shoulder portion 48 which in turn merges into the finish 50. There is also provided immediately below the outwardly blown portion 46 a slightly inset shoulder 52 which forms a sanitary gripping surface by means of which the manual and sanitary handling of the bottle is greatly facilitated, as well as machine handling thereof where tongs or the like are employed to engage and transfer the bottle during various operations thereon.

In FIGURES 9, 10 and 11, a milk bottle having a blown centering wall and sanitary handling surface of the preferred construction is shown with a body portion 53 merging along an inwardly curved wall portion 54 with a wall portion 56 of reduced diameter and slightly inclined upwardly and outwardly from the wall portion 54. The inclined wall 56 merges into a portion 57 of maximum diameter with respect to the inclined wall 56 and this portion 57 then merges into an inwardly inclined wall or shoulder portion 58 which in turn merges into the finish or pouring lip 59. This inwardly and downwardly tapered wall 56 provides a bottle gripping surface relatively remote from the bottle cap for sanitary use.

In both forms of bottles described immediately above in FIGURES 6–11, the outwardly blown surfaces 46 and 57 may each be formed with a relatively short vertically straight portion which serves as the predimensioned guiding and centering ring for properly locating and positioning the bottle in various types of bottle handling machinery as previously described. Alternatively, these portions, and particularly the wall portion 57 constituting the centering wall, may be in the form of a curved wall section merging with the adjacent wall surfaces 56, 58. Then too, these surfaces may be formed with even longer straight portions if desired. In both forms, there is provided means to facilitate the manual or mechanical handling of the bottles. In FIGURE 7, the shoulder portion 52 serves this purpose, while in FIGURE 10 the inclined wall 56 immediately below the central portion 57 serves this same purpose by providing a wedging or tapered surface forming a finger grip or machine element grip for handling the bottle. While these modified forms of centering or guiding surfaces have been shown in connection with a milk bottle, it is, of course, to be understood that these modifications, whether only curved or whether with short or relatively longer straight surfaces, may also be incorporated in cream chamber types of bottles if desired, or square bottles of any type. Likewise, the neck finish may be with cap seats as shown in FIGURES 7 and 10, or with a crimped metal or paper cap fitting over the finish of FIGURE 2.

During the manufacture of the bottles of either of the types shown in FIGURES 1–11, the cross section of the body wall from just below the top pouring lip or finish at the open end of the bottle down to the bottom closing wall is substantially uniform so that there is no accumulation of waste or dead glass in any part of the body wall. This is accomplished by forming the blown centering or guide wall, that is, the annular surface portions 26 (FIGURE 2), 46 (FIGURE 7), or 57 (FIGURE 10) during the actual blowing of the bottle as distinguished from mechanically pressing the glass in the neck portion to provide the prior used thickened outward guide formation or bumper ring or the like. Thus, the only part of the bottle of the present invention which can be considered as pressed in any sense of the word may be the small outward finish 20, 50 or 59 forming the finish or upper lip at the extreme open end thereof. The remainder of the bottles is completely formed by blowing. This eliminates the formation of any accumulated waste material and assists in making an even distribution of the material to various parts of the bottle as needed for strength.

Figure 2:
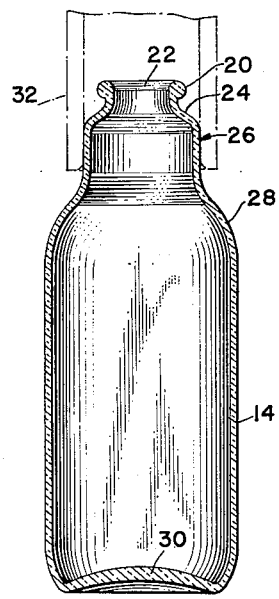
FIGURE 2 is an enlarged vertical section through the bottle shown in FIGURE 1 and illustrating diagrammatically a part of a capping machine cooperating with the blown centering wall of the bottle.
Figure 3:
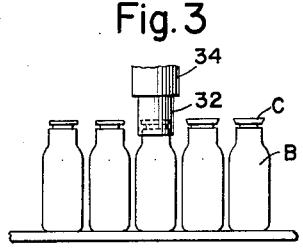
FIGURE 3 is a diagrammatic elevation showing a group of bottles in association with a capping head.

In the milk bottle shown in FIGURES 2, 6 and 9, the body wall of the entire bottle is relatively thin and of substantially uniform thickness throughout the extent thereof. Each type of bottle includes in the neck portion thereof an outwardly extending shoulder portion from which depends a substantially peripheral circular surface disposed substantially parallel to the central axis of the bottle or, in other words, normal to the transverse plane of the pouring end thereof. This peripheral surface is a continuation of the body wall and is of substantially the same thickness thereof so that there is no accumulation of waste or dead material and this results in a uniform and more rapid cooling of the hot bottles during manufacture thereof. The guiding surfaces, whether of the forms shown at 26, 46 or 57 of FIGURES 2, 6, and 10, respectively, serve an important function in various types of bottle handling machinery such as in filling and capping machines, in bottle washing machines, or the like. Each blown guiding or centering surface is disposed relatively close to or almost immediately below the pouring end or finish of the bottle and is of a greater perimeter than the pouring end. On the other hand, however, this guiding surface is of a perimeter less than the perimeter of the body portion of the bottle. In addition to the guiding or centering feature of this annular blown wall surface, the shoulder 24, 48, 58 (FIGURES 2, 7 and 10) with which it merges near the top of the bottle serves as a convenient and necessary stop for contacting the edges of the pocket in the washing machines for positioning the bottle as is customary therein. In the illustrated forms of the invention, the bottom wall 30 of the bottle B (see FIGURE 2) is shown as being slightly thicker than the body wall, whereas the bottom wall in the bottles of FIGURES 7 and 10 is of the same uniform thickness as the body wall. The use of either form of bottom is contemplated, but for maximum reduction in weight, the bottom wall will approximate the wall thickness of the body wall.

The bottle of the present invention is one wherein the blown guiding or centering ring in each illustrated form of the invention is completely formed during the blowing operation and this ring constitutes an accurately formed and externally predimensioned surface adapted to position bottles within close limits in various types of bottle handling machinery. Furthermore, the increased diameter of the bottle below the pouring opening provided by the outward wall portions 26, 46 or 57, is, as previously indicated, of relatively thin and uniform cross section so as to afford an enlarged interior space just be.ow the top of the bottle. More specifically, the pouring opening within the neck finish and immediately above the shoulder 24 (FIGURE 2), 48 (FIGURE 7), 58 (FIGURE 10), is of extremely limited extent longitudinally of the bottle, thus forming a longitudinally shallow pouring opening which is immediately above the inward shoulder at the top of the guiding surface (26, 46, 57). The continuation of the shoulder 24, 48 or 58 into the close and substantially immediately adjacent neck finish thereabove results in this shallow or short pouring opening which is of a diameter smaller than the internal diameter of the guiding or centering wall therebelow. This construction facilitates filling of the bottles in dairies or the like in that this roomier interior tends to reduce the accumulation of foam during the filling operation by facilitating the rising of the foam and the escape thereof through the short pouring passage. It is to be noted that the outward shoulders, 24, 48 and 58 immediately below the neck finish 22, 50 and 59 in each of the illustrated types of bottles presents an inner surface which is inclined gradually outwardly and downwardly so as not to present any abrupt or right-angled bend. This facilitates the egress of foam during the filling operations and also materially assists in washing operations in that it provides effective and unencumbered drainage for the cleaning fluid to escape. Likewise, the substantial reduction of the top weight of these bottles serves to reduce to a minimum breakage thereof due to upending of the bottles during the handling thereof. A further and decided advantage of this construction is that the short vertical extent of the pouring opening, forming as it does a shallow passage, reduces to a minimum and substantially eliminates the formation of any extended cream plug or bridge in this area and this applies to cream chamber type or plain bottles. Thus, the short pouring opening obviates the possibility of the formation of a longitudinally extended cream plug which is difficult to break loose and which, upon being released, often results in a sudden surge and spilling of the contents.

It will be further apparent from the foregoing description that the present invention contemplates the inclusion of the blown centering and guiding wall surface in any size bottle, such as a half-pint, pint or quart, or larger, in a plain type of bottle as illustrated in FIGURES 1, 6 and 9. Still further, it is to be understood that this feature can be incorporated in such bottles with various sizes of neck openings, such as the relatively small 38 mm. finish, as shown in FIGURES 1 and 2, or in the larger types of finish or with "common sense" or "multicap" finishes of various sizes, and with all types of bottles the thickness of the wall thereof remains substantially uniform throughout the entire extent with the resultant advantages heretofore pointed out. With this thin and substantially uniform wall thickness throughout the extent of various types of bottles, it will be appreciated that the invention results in substantial and cumulative savings in space occupied, the amount of glass utilized with resultant saving in shipping weight, and with the smaller neck finishes, there also results a substantial saving in cap materials, all of which are important in reducing the costs to the manufacturer, the milk distributor and the consumer or customer buying the milk.

To emphasize the substantial savings accomplished by the present invention, the standard half-pint milk bottle of conventional design now in use weighs approximately eight ounces and has an average body wall thickness of about .125 of an inch. A half-pint bottle made in accordance with the present invention weighs approximately four and one-quarter ounces and has an average body wall thickness of approximately .075 of an inch, which is substantially uniform throughout the extent thereof except at the finish or mouth bead. A standard pint milk bottle weighs approximately thirteen ounces and has an average wall thickness of about .125 of an inch. A standard type pint bottle made in accordance with the present invention weighs in the range of seven to nine ounces. A standard pint bottle of the present invention is about six and nine-sixteenths inches high with the cross section between flat sides about two and twenty-one thirty-seconds inches and it weighs about seven ounces and the wall thickness is about .075 of an inch. Thus, there is a saving in weight of from four to six ounces. A standard quart milk bottle presently in use weighs approximately seventeen and three-quarter ounces and has an average wall thickness of around .125 of an inch. A standard type quart bottle made in accordance with the present invention weighs only about twelve to fifteen ounces and has an average wall thickness of approximately .075 of an inch. A two quart bottle of the present invention will weigh about twenty-five ounces and have a wall thickness of .10 of an inch.

It will be seen, therefore, that a half-pint standard type bottle made in accordance with the present invention weighs approximately one-half the weight of a standard type half-pint bottle now in general use, whereas a quart bottle of the standard type made in accordance with the present invention accomplishes a saving of over five ounces, or about thirty percent of the weight of the standard type quart bottle now in use. As an example of the substantial savings in material, cost of manufacture, cost of shipment and the like, a gross of half-pint bottles made in accordance with the present invention have been packed in a carton with total weight of approximately forty pounds whereas a similar carton containing one gross of conventional half-pint bottles weighs approximately seventy-five pounds, thus effecting a saving of over thirty-five pounds per gross. A shipment of two and one-half gross of half-pint bottles made in accordance with the present invention can be accomplished for the cost of one hundred pounds of freight so that with a prevailing freight rate of fifty cents per hundred weight, a gross of these packed bottles can be shipped for twenty cents. With the above specific examples, the substantial savings are apparent when considering a ten ton truck carrying five hundred gross on a single load. Insofar as the manufacture of these bottles of reduced weight is concerned, about fifty bottles per minute run on a conventional four-mold machine and this approximates twice the speed of the conventional half-pint milk bottles on the same machine. Yet there is no more weight going into the lehr so that the same lehr can be employed, by using only a higher belt speed.

Even with the substantial decrease in weight of a bottle made according to the present invention incorporating the uniformly thin body and bottom wall, as indicated above, tests have proven that the bottle made according to the present invention is, nevertheless, stronger than conventional milk bottles of the type now in use and having substantially greater wall thicknesses and weight. This increased strength is due in part to the substantially uniform thickness of the peripheral body wall, that is, the entire wall of the bottle from immediately below the pressed bead or finish to the base wall of the bottle. Such a relatively thin body wall of substantially uniform thickness is possible, according to the present invention, because heat dissipation by contact of the mold parts is only at the pressed bead or finish 20 and perhaps one-eighth of an inch therebelow. Therefore, this minute top portion of the parison blank is the only portion which is cooled to any great extent and the entire remaining wall is therefore at a higher temperature, permitting this entire wall portion to be outwardly blown in forming the completed bottle. In other words, the entire wall of the parison blank beneath a recessed support portion of the blow mold is blown outwardly due to the fact that chilling has been limited to the minute bead formation or finish 20 with the remaining part of the parison blank at a relatively higher temperature so that this entire depending portion of the blank is free to flow under the influence of the air pressure. It is in this manner that the uniform and relatively thin wall thickness is accomplished and, as pointed out hereinbefore, this relatively thin and uniform body wall thickness assists in strengthening the bottle in that there is a uniform cooling during annealing without setting up any internal stresses normally caused by portions of increased or uneven wall thicknesses.

In FIGURES 12 through 17, certain modifications of the bottle are shown as applied to a cream chamber type of bottle. Referring to FIGURES 12 and 13, the bottle includes a body portion 120 merging into a reduced throat 122 above which is formed a slightly bulbous cream chamber wall 124, the upper portion 132 of which merges into a substantially vertically disposed and cylindrical guiding surface 134. This guiding surface 134 then merges along an inwardly and upwardly inclined portion 136 to a cylindrical portion 126 terminating in the pouring finish or bead 128, defining therein the pouring opening 130. As previously described, the guiding surface 134 is adapted for cooperation with the skirt 129 of a capping head 131 (see FIGURE 14) or the like for forming the cap material C over the finish 128. In FIGURE 17, a modification of the guide surface 134 is shown. The upper portion of the wall 132 of the cream chamber merges into an upwardly and outwardly inclined wall portion 135 which in turn merges into the upwardly and inwardly inclined wall portion 136a, comparable to the portion 136 previously described. The outside surface where the wall portions 136a and 135 join one another constitute the peripheral guiding surface 134a adapted also for cooperation with the head of a capping machine or the like.

In the above described cream chamber type of bottle, as in the previously described bottles, the upwardly and inwardly inclined inner surface of the wall portions 136, 136a facilitate pouring of the contents, eliminating internal angular corners, and facilitate the egress of foam during filling operations and the like.

This application is a continuation-in-part of my application Serial No. 116,163, filed September 16, 1949, for Bottle with Blown Centering Wall; also of my presently pending application, Serial No. 202,374, filed December 22, 1950; also of my presently pending application, Serial No. 202,375, filed December 22, 1950.

While certain forms of the invention have been shown and described for purposes of illustration, it is to be clearly understood that various changes in the details of construction and arrangement of parts, may be accomplished without departing from the scope and spirit of the invention as set forth in the appended claims.

I claim:

1. A glass bottle for milk and other liquids, comprising a pressed finish defining a pouring opening at the top of the bottle, and a body having the wall thereof of substantially uniform thickness and blown throughout the extent thereof from immediately adjacent and below the pressed finish whereby to eliminate areas of dead or pressed glass and to thus reduce the setting up of internal breaking and weakening stresses in the body wall, said body including a lower body portion of maximum periphery and maximum vertical height with respect to the overall height of the bottle, the said body portion of maximum periphery merging into a first upper portion of reduced periphery close to the top of the bottle and spaced below the finish, the said portion of reduced periphery merging into an upwardly and outwardly inclined outer wall portion terminating in a portion having a guiding shoulder surface included in the blown body wall; the portion of reduced periphery and the upwardly and outwardly inclined portion and the portion having the guiding surface all having substantially the same uniform wall thickness as the lower body portion of maximum periphery; and said guiding shoulder surface having a peripheral extent intermediate that of the finish and body and disposed immediately adjacent and below the pressed finish and projecting outwardly therefrom a sufficient radial extent to provide a centering and guiding surface cooperative with the skirt of a capping machine or the like without interference from the cap material, said upwardly and outwardly inclined wall portion and its juncture with said guiding surface forming a relatively extensive and readily grasped sanitary finger gripping surface adjacent the finish with the guiding surface serving to position the fingers away from an applied cap or the finish during lifting of the bottle, the internal and external surfaces of the body portion disposed between and interconnecting the guiding shoulder surface and the pressed finish sloping inwardly and upwardly into a second upper portion of reduced periphery.

2. A glass bottle as claimed in claim 1, wherein the first upper portion of reduced periphery includes an outwardly bulging cream chamber wall below the guiding shoulder surface.

References Cited in the file of this patent

UNITED STATES PATENTS

| | | |
|---|---|---|
| D. 112,532 | Meier | Dec. 13, 1938 |
| D. 116,349 | Mas | Aug. 29, 1939 |
| D. 116,860 | Mas | Sept. 26, 1939 |
| 2,024,748 | Schaffer et al. | Dec. 17, 1935 |
| 2,644,599 | Blunt | July 7, 1953 |